Figure 6:
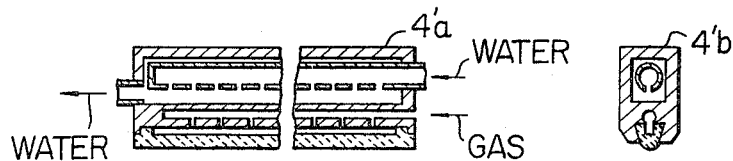
Figure 7:
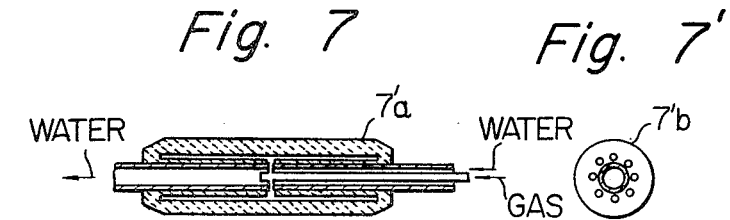

United States Patent
Kita et al.

[15] 3,637,361
[45] *Jan. 25, 1972

[54] PROCESS FOR THE MANUFACTURE AND SIZING OF FLOAT GLASS

[72] Inventors: Hideo Kita, Amagasaki-shi; Kunihiko Ito, Nishinomiya-shi, both of Japan

[73] Assignee: Nippon Sheet Glass Co., Ltd., Osaka, Japan

[*] Notice: The portion of the term of this patent subsequent to May 6, 1986, has been disclaimed.

[22] Filed: Dec. 12, 1968

[21] Appl. No.: 785,048

Related U.S. Application Data

[63] Continuation of Ser. No. 479,548, Aug. 13, 1965, abandoned.

[30] Foreign Application Priority Data

Aug. 22, 1964 Japan..................39/47654

[52] U.S. Cl..................65/25, 65/65, 65/99, 65/169, 65/182
[51] Int. Cl..................C03b 39/00
[58] Field of Search.............65/25 A, 91, 65 A, 99 A, 182, 65/169, 92

[56] References Cited

UNITED STATES PATENTS

| | | | |
|---|---|---|---|
| 1,761,219 | 6/1930 | Mambourg | 65/91 |
| 2,387,886 | 10/1945 | Devol | 65/25 |
| 2,444,731 | 7/1948 | Devol | 65/25 |
| 2,478,090 | 8/1949 | Devol | 65/25 |
| 2,505,103 | 4/1950 | Devol | 65/25 |
| 3,266,880 | 8/1966 | Pilkington | 65/99 |
| 1,827,138 | 10/1931 | Brancart | 65/25 A |
| 1,841,527 | 1/1932 | Fraser | 65/92 |
| 1,841,576 | 1/1932 | Drake | 65/92 |
| 3,442,636 | 5/1969 | Kita et al. | 65/182 |

*Primary Examiner*—S. Leon Bashore
*Assistant Examiner*—J. B. Hardaway
*Attorney*—Wenderoth, Lind & Ponack

[57] ABSTRACT

A process for the manufacture of sheet glass which involves flowing a controlled amount of molten glass down an inclined plane onto and along the upper surface of a bath of molten metal. The molten glass is sized by passing it beneath a sizing member which extends widthwise of the bath and which has at least the portion thereof facing the molten glass layer passing thereunder composed of a porous and permeable material. Producer gas or hydrocarbon gas is introduced into the sizing member and is blown out through the porous and permeable portion thereof to form and maintain a burning gaseous film between the surface of the sizing member and the molten glass layer.

5 Claims, 15 Drawing Figures

PATENTED JAN25 1972 3,637,361
SHEET 1 OF 2
Fig. 1
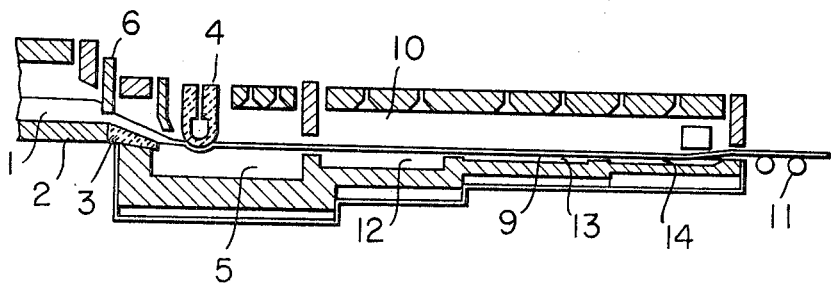
Fig. 2     Fig. 3
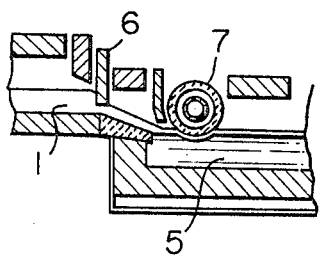 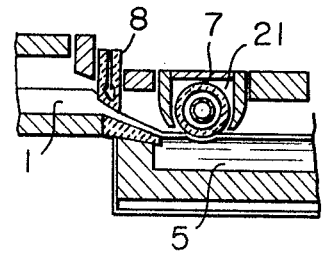
Fig. 4     Fig. 4'
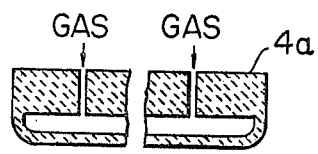 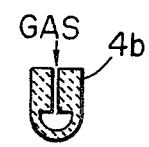
Fig. 5     Fig. 5'
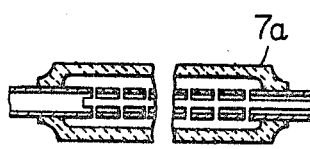 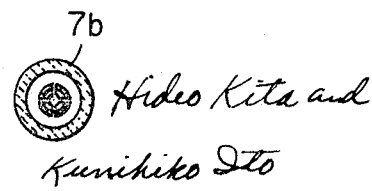
Hideo Kita and
Kunihiko Ito
INVENTORS
BY Wenderoth,
Lind and Ponack ATTORNEYS

PROCESS FOR THE MANUFACTURE AND SIZING OF FLOAT GLASS

This is a streamlined continuation of application Ser. No. 479,548 filed Aug. 13, 1965, now abandoned.

The present invention relates to a process for the continuous manufacture of sheet glass.

Various processes have been practiced for the manufacture of sheet glass continuously. For example, there is a process of drawing molten glass upwardly from the free surface of a molten bath or through a refractory slit. Also a process of sizing molten glass by means of a pair of metal rollers is known. The molten glass so rolled between a pair of metal rollers may be reheated on a molten metal bath. Furthermore, there is also a known process wherein molten glass is directly flowed onto a molten metal bath without a preceding sizing operation so it can be reheated and drawn under a suitable tension.

However, the above known processes each have deficiencies inherent therein. To wit, the process of upwardly drawing molten glass does not produce sheet glass of a uniform thickness, and the drawing speed cannot be raised over a certain limit. In the process of sizing molten glass by means of a pair of metal rollers, the glass surfaces after the sizing tend to have numerous fine uneven portions due to shrinkage because the molten glass having a high temperature is quenched by the water-cooled metal rollers, or unevenness caused by the scale formed on the surfaces of the rollers, and thus smooth, lustrous and transparent sheet glass cannot be obtained. The process of reheating the sized glass consumes a large amount of fuel or electricity, and for reducing the unevenness in the glass surface to a satisfactory degree, a vary long molten metal bath is required. The process of letting molten glass flow onto a molten metal bath without sizing can avoid such deficiencies caused by the sizing but the controlling of the amount of molten glass flowed and consequently of the thickness of the resultant sheet glass by means of a refractory damper is difficult. Therefore, sheet glass having a desired uniform thickness throughout its width can not easily be obtained by this process, and in order to make uniform the thickness of the product the sheet glass must be maintained on a molten metal bath at a very high temperature for a long time. For this purpose a vary long molten metal bath is required, and the consumption of fuel or electricity therefor becomes great.

We previously proposed, as a process for the manufacture of sheet glass free from the above-described deficiencies inherent in the conventional art, a process wherein molten glass is allowed to flow down an inclined plane continuously and immediately thereafter to pass between a metal roller and the upper surface of a bath of molten metal to be sized thereby, under the pending Japanese Patent Application No. 69417/1963.

However, even by that improved process the formation at the time of sizing of small amounts of unevenness in the glass surface coming in direct contact with the metal roller cannot be completely avoided, as the surface is quenched by the roller. Also the surface of the roller is apt to be contaminated by glass. Therefore as a process for easily obtaining smooth, lustrous sheet glass, our previously proposed process cannot be said to be entirely satisfactory.

It has now been found that the above-described deficiencies and disadvantages in the prior art can be overcome by a process wherein a controlled amount of molten glass is allowed to flow down an inclined plane and led to a space between a sizing means, of which at least the portion facing the glass layer passing thereunder is composed of a porous and permeable material, and the upper surface of a bath of molten metal, and a gas under pressure introduced into the sizing means is blown out through the portion of the sizing means facing the molten glass layer passing thereunder, to form and maintain a thin film of the gas between the surface of the sizing means and the glass so that the glass is sized between the gaseous film and the upper surface of the bath of molten metal.

Figure 8:
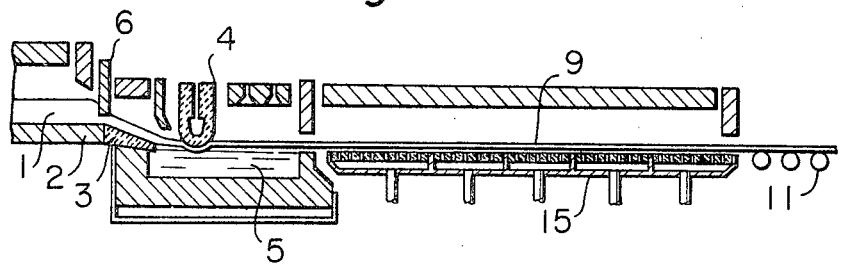
Figure 9:
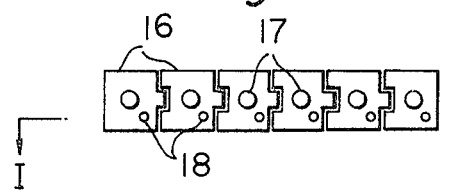
Figure 9:
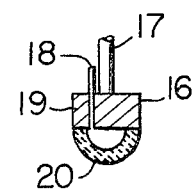
Figure 10:
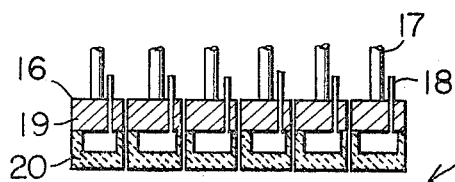

Referring to the attached drawings, FIG. 1 is a vertical sectional view of an apparatus suited to practice the process of this invention; FIGS. 2 and 3 are partial vertical sectional views showing modifications of the apparatus of FIG. 1; FIGS. 4 and 4', 5 and 5', 6 and 6', and 7 and 7' illustrate various sizing means suited for use in practicing the process of this invention; FIG. 8 is a vertical sectional view of a different apparatus suited to carry the sized sheet glass; FIGS. 9 and 9' are plan and sectional elevation views illustrating an embodiment of divided sizing means; and FIG. 10 is a transverse section along the line I—I in FIG. 9.

Referring to FIG. 1, the molten glass 1 leaves the forehearth 2 of a melting tank and flows down on a lip tile 3 and is led to a space between the sizing means 4 and the upper surface of a bath 5 of a molten metal. The amount of the molten glass flowing can be controlled by means of a vertically movable damper 6 provided at the exit of the forehearth 2.

The sizing means 4 is composed of porous and permeable graphite, and its structure is shown in FIGS. 4 and 4'. The graphite used herein has a porosity of about 30 percent. The sizing means may be substantially entirely composed of a porous material, but it is sufficient that the lower portion thereof, i.e., the portion facing the molten glass, is of a porous and permeable structure. For the porous portion of the sizing means, such refractory materials as high-aluminous refractory, sintered silicon carbide and the like, and sintered alloys may be used as well as graphite. The surfaces of the porous portion should preferably be finished. The sizing means may be stationary or may be rotatable like a roller. In case of the latter, the entire surface thereof must be of the porous structure. One embodiment in which the porous sizing means is of the form of a roller is shown in FIGS. 2, 5 and 5'. The sizing means may be a water-cooled structure as shown in FIGS. 6, 6', 7 and 7'. FIGS. 9, 9' and 10 show one embodiment of a sizing means which is divided in the direction of the width thereof consisting of a plurality of small sizing means, in which 16 denotes each of the small sizing means which are all vertically movable, 17 is the adjustment rod for vertically moving the small sizing means 16, 18 is a conduit for introducing a gas under pressure, 19 is a portion made of heat-resisting steel and 20 is the portion made of a porous material. When such a sizing means is used, the thickness of the product in the direction of the width of the sheet glass can be made uniform more easily than when using a nondivided sizing means, by detecting the thickness of the sized sheet glass at points across its width and automatically and precisely controlling the vertical positions of the small sizing means in accordance therewith. The metal used for the bath 5 must have a higher specific gravity in the molten state than that of the molten glass, and must be nonreactable with the molten glass. Metals having a melting point no higher than about 600° C. and a boiling point no lower than about 1,100° C., such as tin, lead, alloys of tin and lead or of tin and aluminum are useful, particularly tin being preferred. The temperature of the molten metal in the bath should be maintained at about 900°–1,100° C.

The molten glass is continuously sized by being subjected to the influence of buoyancy caused by the difference in specific gravities of the molten metal of the bath 5 and the glass, as well as to the downward pressure of the sizing means 4. The level of the sizing means relative to the upper surface of the bath 5 is suitably controlled depending on the desired thickness of the product sheet glass and the specific operating conditions such as the amount of flow and the temperature of the glass and the rate of transfer of the sheet glass.

During the sizing of the molten glass between the porous sizing means 4 and the upper surface of the bath 5, a gas at a predetermined pressure and temperature is introduced into the sizing means 4, so that a thin film of the gas will be formed and maintained between the surfaces of the sizing means and the molten glass layer. When the porous sizing means is made of graphite, nitrogen gas is suitable for this purpose, whereas when it is of a refractory material, air or a combustible gas e.g., producer gas, a hydrocarbon gas such as propane or butane is suitable. Such a combustible gas burns on the surface of the sizing means and therefore performs so-called fire-polishing simultaneously with the sizing when it is used in this invention, and thereby enables the production of sheet glass having highly lustrous and smooth surfaces.

The pressure of the gas to be introduced into the sizing means should be determined depending on the resistance of the sizing means to transmission of the gas, i.e., permeability and thickness of the porous portion thereof. In case the porous portion has a porosity on the order of 20–30 percent, generally a pressure of the gas of about 1–3 kg./cm.$^2$ is satisfactory. When the pressure of the gas is too high, objectionable cords tend to appear in the glass, while if it is too low, the glass tends to adhere to the sizing means. Those who are reasonably skilled in the art should be able to easily determine the optimum pressure of the gas in each specific case for forming and maintaining a thin gaseous film between the surfaces of the sizing means and of the glass layer by experiments.

It is recommended that the gas to be introduced into the sizing means should be preheated to a temperature as close as possible to that of the glass to be sized. The amount of flow of the gas may be relatively small, and in most cases an amount of about 60 cm.$^3$/min. per one square centimeter of the surface area of the porous and permeable portion of the sizing means (at the standard condition of 0° C. and 760 mm. Hg) or less is satisfactory.

In case graphite is employed as the porous material for the sizing means, even when a high-purity nitrogen gas is used, erosion of graphite sometimes takes place due to the oxidizing nature of the atmosphere of the sizing means or impingement of an exhaust gas from the glass-melting furnace or the molten metal bath against the sizing means. Therefore, provision of a chamber 21 filled with a protective gas ($N_2$) around the sizing means is recommended for the prevention of such possible erosion of graphite.

The sheet glass 9 as sized is subsequently cooled by a cooling tank 10 to about 600° C., and thereafter is carried away by means of a roller conveyor 11. At such a temperature the glass is already sufficiently solidified so the surfaces thereof are not damaged by contact with the metal rollers. In FIG. 1 the cooling tank 10 consisting of cooling baths 12, 13 and 14 of tin the temperatures of which are controlled to have successively lower temperatures in the stated order shown. This is not the sole possible structure, but modifications thereof are possible. For example, instead of using the cooling tank 10, the glass may be carried away while being supported by air jetted against the glass, while the temperature of the said air is regulated to perform the cooling of the glass (FIG. 8). In FIG. 8, 15 is a refractory flat plate having many pores on the surface thereof through which air is jetted upwards to support the sheet glass 9.

Furthermore, in place of the aforesaid damper 6 for regulating the flow of the molten glass, a damper 8 composed of a porous material similar to the sizing means used in this invention may be adopted with an increased effectiveness (FIG. 3). Because, as the ordinary damper 6 tends to have the molten glass adhere thereto, the flow of the glass from such a damper is not smooth and tends to produce objectionable cords therein. Whereas when the porous damper 8 is employed, such adhesion of the glass to the damper can be avoided, and so a smooth flow of molten glass having a substantially uniform thickness in the direction of its width and which has the surface free from the above-mentioned defects can be sent into the sizing means.

According to the present invention, the molten glass is sized between the thin gaseous film formed and maintained on the surface of the sizing means and the upper surface of the molten metal bath, without a direct contact with, or being quenched by, the sizing means. On the other hand, the sizing means also is protected by the gaseous film from contamination by the glass or exhaust gas. Consequently, sheet glass having a highly smooth and lustrous surface can be very easily and continuously produced. In addition, as the bottom surface of the sheet glass is sized while being in contact with a high-temperature molten metal, the same is not quenched during the sizing, and so a very smooth bottom surface similar to the upper surface can be obtained. Furthermore, the sheet glass sized in accordance with the process of this invention need not be reheated after the sizing, having already satisfactory smooth surfaces. It is sufficient for the sheet glass sized in accordance with the process of this invention to be subsequently cooled on a bath of molten metal until it acquires a sufficient hardness so that its contact with metal rollers of an ordinary roll conveyor does not damage the surface thereof. Therefore, in practicing the present invention, the length of the bath of molten metal used for this purpose can be very much shorter than that required for a conventional molten metal bath used for reheating sheet glass thereon, which has such advantages as reduction in equipment cost, floor area and cost of fuel. Again in accordance with the process of this invention, a product which is too thin to be manufactured by the conventional processes using a molten metal bath can be readily obtained.

We claim:

1. A process for the manufacture of sheet glass comprising flowing a controlled amount of molten glass down an inclined plane onto and along the upper surface of a bath of a molten metal, and sizing the molten glass by the steps consisting essentially of positioning a sizing member at the surface of the molten metal bath and extending widthwise of the bath and having at least the portion thereof facing the molten bath thereunder and extending entirely across the molten bath composed of a porous and permeable refractory material, holding the sizing member in a fixed position, passing the molten glass between the sizing member and the molten metal bath, and introducing a combustible gas selected from the group consisting of producer gas and hydrocarbon gas into the sizing member and blowing it out through the portion of the sizing member facing the molten glass layer to burn on the surface of the sizing member and form and maintain a thin gaseous film between the entire width of the surface of the sizing member and the molten glass layer for sizing and fire-polishing the glass between the gaseous film and the upper surface of the bath of the molten metal without driving the glass by the sizing member, whereby the entire width thereof is smoothed and polished, the refractory material of the sizing member being nonconsumable by the combustion of the combustible gas.

2. The process as claimed in claim 1 in which the gas introduced into the sizing means is blown out at the rate of up to about 60 cm.$^3$ (at standard temperature and pressure)/min. per square centimeter of the surface area of the porous and permeable portion of the sizing means at the standard state.

3. The process as claimed in claim 1 in which the porous and permeable material is a sintered alloy.

4. The process as claimed in claim 1 in which the gas is preheated to a temperature of the molten glass or a temperature close thereto.

5. A process for the manufacture of sheet glass comprising flowing a controlled amount of molten glass down an inclined plane onto and along the upper surface of a bath of a molten metal, and sizing the molten glass by the steps consisting essentially of positioning a rotatable sizing member at the surface of the molten metal bath and extending widthwise of the bath and extending entirely across the molten bath and the entire sizing member being composed of a porous and permeable refractory material, holding the sizing member with the axis of rotation at a standstill with respect to the advance of the glass, passing the molten glass between the sizing member and the molten metal bath, and introducing a combustible gas selected from the group consisting of producer gas and hydrocarbon gas into the sizing member and blowing it out through the sizing member to form and maintain a thin gaseous film between the entire width of the surface of the sizing member and the molten glass layer for sizing and fire-polishing the glass between the gaseous film and the upper surface of the bath of the molten metal without driving the glass by the sizing member and the entire width thereof is smoothed and polished, the refractory material of the sizing member being nonconsumable by the combustion of the combustible gas.

* * * * *